United States Patent [19]
Puzio et al.

[11] Patent Number: 5,979,523
[45] Date of Patent: Nov. 9, 1999

[54] TABLE SAW

[75] Inventors: Daniel Puzio, Baltimore; Michael L. O'Banion, Westminster; Robert S. Gehret, Hampstead; Warren A. Ceroll, Owings Mills; Robert P. Welsh, Cockeysville; Scott M. Livingston, Catonsville; Louis M. Shadeck, Timonium; Frederick R. Bean, Finksburg, all of Md.

[73] Assignee: Black & Decker Inc., Newark, Del.

[21] Appl. No.: 09/168,206

[22] Filed: Oct. 6, 1998

Related U.S. Application Data

[62] Division of application No. 08/717,539, Sep. 20, 1996, Pat. No. 5,857,507.

[51] Int. Cl.$^6$ ....................................................... B27H 1/00
[52] U.S. Cl. ........................ 144/286.5; 144/287; 144/1.1; 83/648; 83/477.2; 108/27
[58] Field of Search .................................... 83/438, 471.3, 83/477.2, 477.3, 574, 648; 108/27, 35, 36, 38; 269/901; 144/1.1, 286.1, 286.5, 287

[56] References Cited

U.S. PATENT DOCUMENTS

| | | | |
|---|---|---|---|
| 2,829,705 | 4/1958 | Godshalk et al. | 108/27 |
| 4,186,784 | 2/1980 | Stone | 144/1.1 X |
| 5,174,349 | 12/1992 | Svetlik et al. | 144/286.5 |

*Primary Examiner*—W. Donald Bray
*Attorney, Agent, or Firm*—Harness, Dickey & Pierce, P.L.C.

[57] ABSTRACT

A table saw or other cutting machine includes carrying members on an underside of the work table generally adjacent the flanged table edge in order to provide an increased gripping surface area to be grasped by the operator when lifting and transporting the cutting machine. The machine is preferably equipped with invertible extension support assemblies for supporting a workpiece extending horizontally beyond the work table. Such support assemblies include support members slidably extendable horizontally on rods toward and away from the work table. A dust deflection skirt extends from a lower surface of the work table into the generally hollow dust-receiving cavity portion of a dust shroud located within the saw's enclosed base. This skirt deflects dust or chips into the interior of the hollow dust-receiving cavity. Anti-kickback spacers are preferably sealed-end blind rivets mounted on the anti-kickback pawls at intermediate locations thereon. Such spacers slidably maintain the anti-kickback pawls in a generally parallel relationship with the kerf splitter plate. Also hardened portions of the throat plate keep it from being damaged by serrated edges of the anti-kickback pawls and to prevent binding when the blade is lowered.

12 Claims, 10 Drawing Sheets

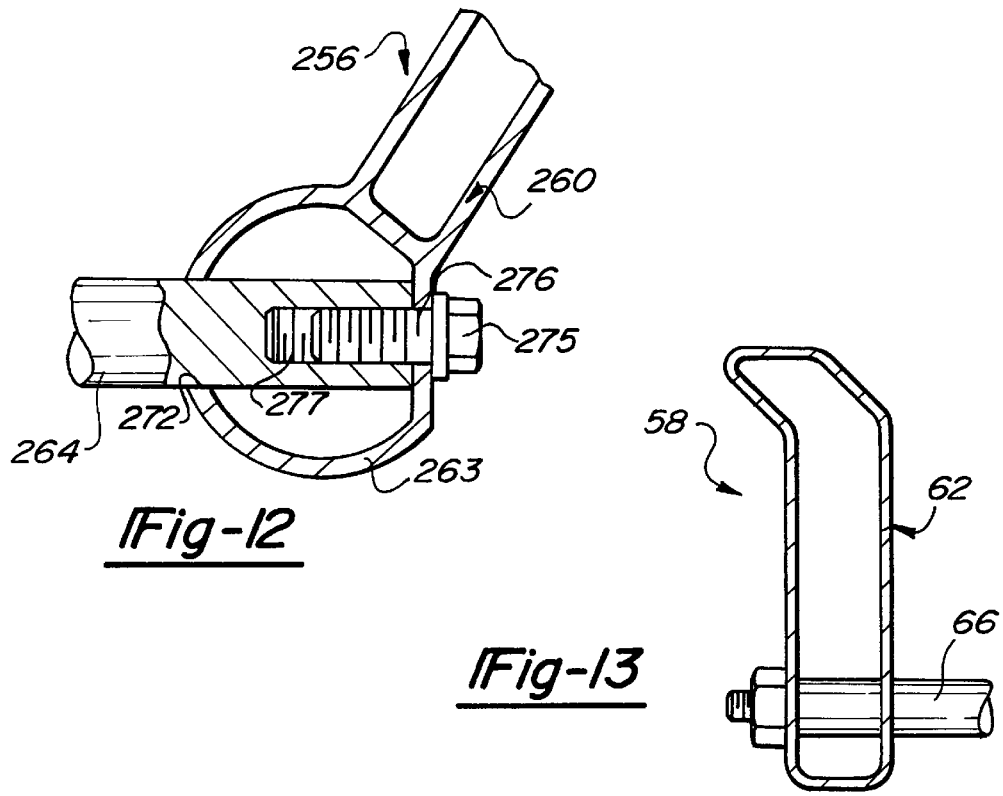
Fig-12
Fig-13
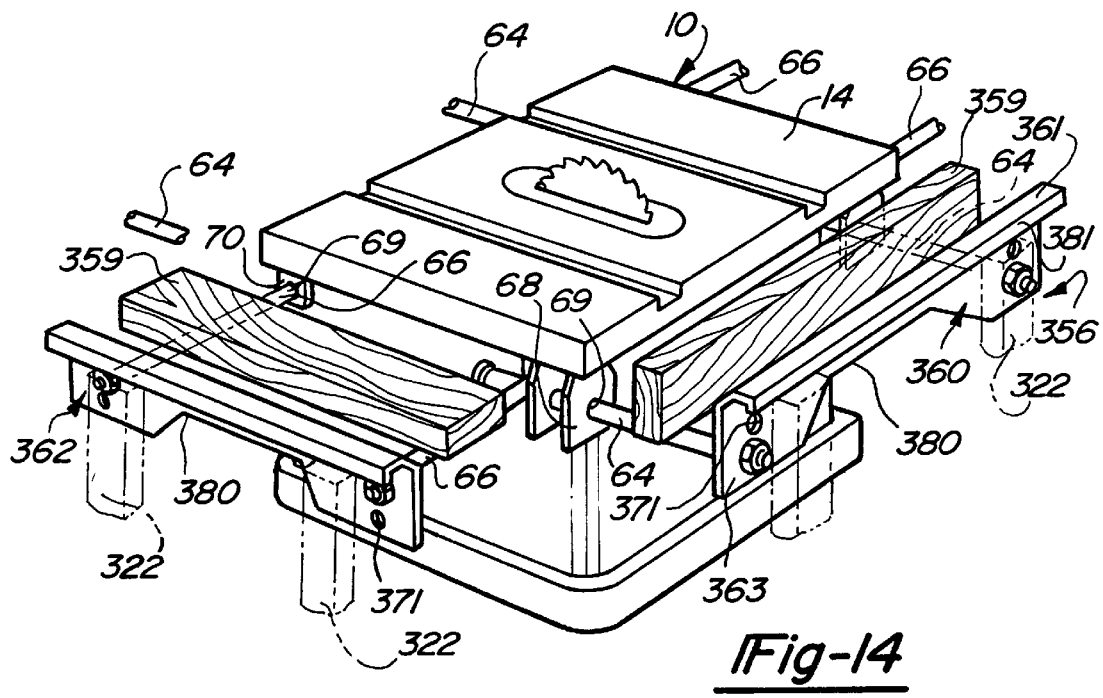
Fig-14

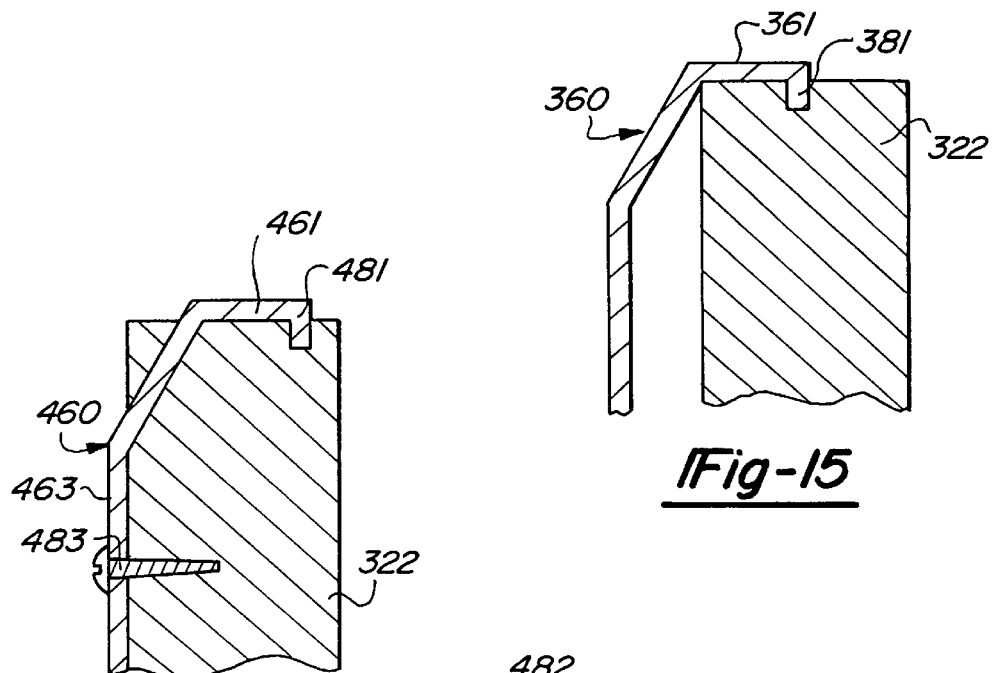
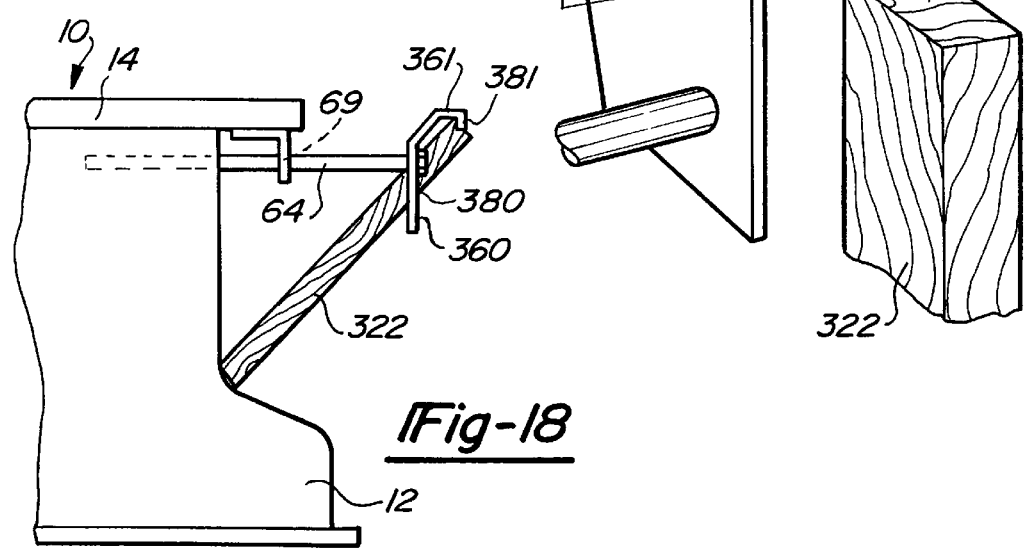

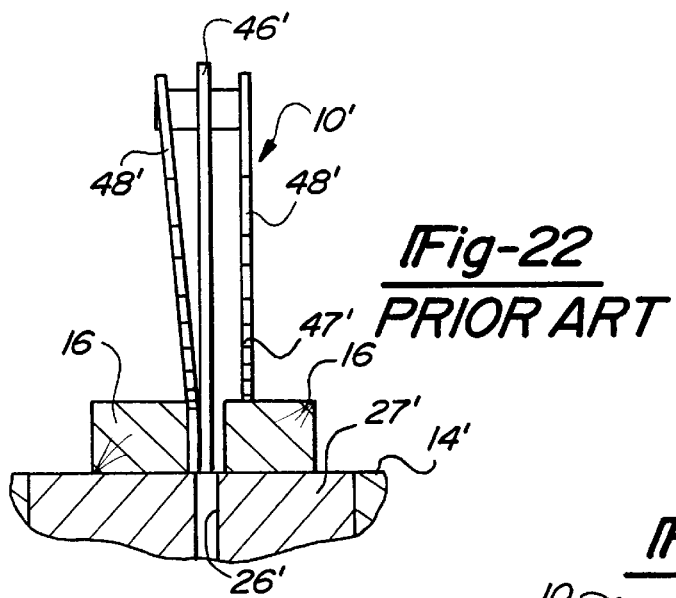
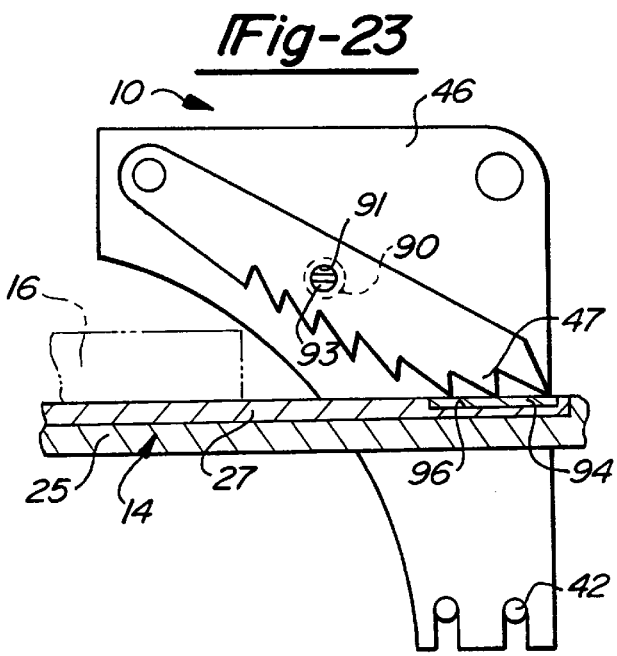
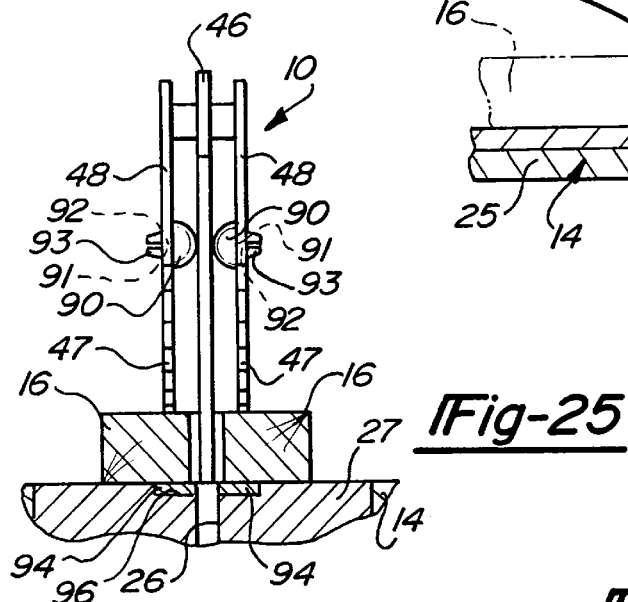
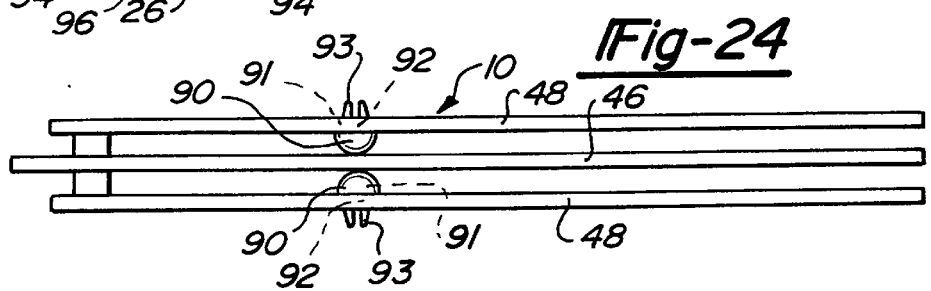

TABLE SAW

This is a division of U.S. patent appliaton Ser. No. 08/717,539, filed Sep. 20, 1996.

BACKGROUND AND SUMMARY OF THE INVENTION

The present invention relates generally to workpiece cutting machines and especially to table saws. More particularly, the present invention relates to various anti-kickback apparatuses, dust-deflecting features, machine carrying features, and apparatuses for supporting and handling large workpieces.

A typical cutting machine or table saw generally includes a base that supports a generally flat table top having a longitudinally extending throat slot or opening through which a saw blade or other cutting tool protrudes above the table for engaging a workpiece. A motor is mounted beneath the table top, and the cutting tool, typically a circular saw blade, is mounted for rotation with the output shaft of the motor. The blade or cutting tool is positioned to effect cutting of the workpiece as it is moved longitudinally along the table in a frontward-to-rearward direction generally parallel to the plane of the cutting tool. The blade or other cutting tool can be lowered or raised with respect to the table top to accommodate workpieces of varying thicknesses and can be adjusted to various angular orientations relative to the plane of the table top in order to cut bevels or other such angular cuts on the workpiece. Typically, a kerf splitter or riving knife is adjustably raised or lowered and/or disposed at various angular orientations along with the blade or cutting tool.

Power driven cutting devices, such as table saws, planers, jointers and the like, have frequently been cumbersome and difficult to transport from one work site to another. Or, if made to be readily transportable, such devices have typically been ill-suited for performing cutting operations on large workpieces.

In addition, such prior cutting machines have recently begun to be more frequently equipped with built-in dust or chip extraction apparatuses, but many of these extraction apparatuses still fall short in their ability to effectively convey dust and chips away from the cutting site and to avoid undesirable accumulation of dust or chips inside cabinets or enclosures housing the various drive assemblies and cutter positioning mechanisms of the cutting machine.

Furthermore, the prior art guard mechanisms on such cutting machines have frequently included anti-kickback devices designed to prevent the rotating blade or other cutting tool from grabbing fully or partially cut workpieces and dangerously throwing rearwardly, back toward the operator. A typical example of such anti-kickback devices includes downwardly-biased spring-loaded pivotable anti-kickback pawls spaced apart on opposite sides of the kerf splitter or riving knife, which is positioned rearwardly of the blade or cutting tool and aligned with the cutting plane. Such pawls commonly include toothed or serrated lower edges under which the workpiece slides as it is fed rearwardly past the blade, but which grip the workpiece and prevent it from being kicked back if it tends to move back toward the operator. However, such prior anti-kickback pawls are frequently easily deflected laterally toward the blade or cutting tool, where they can become caught between the splitter and the slot in the saw's throat plate or between the splitter and the edge of a workpiece and thus become rendered ineffective. Additionally, it has been found that the serrated lower edges of such anti-kickback pawls tend to undesirably dig into or abrade the softer metal or plastic material of the throat plate, such as when the blade is raised and then lowered.

In table saws or other cutting machines with the work table having a downwardly-extending flanged edge extending around at least a portion of its periphery, the present invention provides one or more carrying members on an underside of the work table generally adjacent the flanged edge. Such carrying members have a lateral dimension substantially greater than the lateral thickness of the flanged edge in order to provide an increased gripping surface area to be grasped by the operator in order to lift and transport the cutting machine from one work location to another. Such carrying members can be separate and attached to the underside of the table or integrally formed with the table. Such cutting members can be defined by a series of spaced-apart ribs extending downwardly from the underside of the work table and located generally adjacent the flanged edge thereof. In this embodiment, the ribs have downwardly-facing edges that together define the increased gripping surface area.

The table saw or other cutting machines in accordance with the invention are preferably equipped with one or more extension support assemblies for supporting a workpiece extending horizontally outward of the lateral extent of the work table. Such extension support assemblies can be provided at the front (infeed) and/or rear (outfeed) sides of the work table and/or on either or both of the right and left sides. These extension support assemblies include generally horizontal support members and at least one rod or other such extension member slidably extendable horizontally from beneath the work table in directions toward and away from the work table, with the support members being interconnected with the rod for slidable extension toward and away from the work table with the rod.

In this regard, it has been found to be especially advantageous to provide such an extension support assembly on the left side of the work table (as viewed by an operator standing at the front side of the work table). This arrangement, according to the invention, can be combined with a rip or other workpiece feed fence that is capable of being positioned on only the right side of the blade or cutting tool, or with a fence positionable on either the right or the left side of the blade or cutting tool. In such an arrangement the left-side extension support member can be extended leftwardly out to a distance from the work table sufficient to support a common four-foot wide by eight-foot long sheet material workpiece (such as a plywood or particle board sheet or other common four-by-eight sheet materials) on the left side of the blade at or leftwardly beyond the longitudinal centerline of the sheet as it is fed longitudinally into the blade or cutter with its long dimension parallel to the plane of rotation of the blade or cutting tool and with the fence on the right side of the blade or cutter, regardless of how close to the blade or cutter the fence is positioned. Therefore, in such a setup, a four-by-eight sheet workpiece can have a greater amount of its weight supported by the work table and the left-side extension support assembly than the amount of its weight that is leftwardly beyond the extension support member and unsupported, no matter how much of the sheet is being rip-cut off between the right side of the blade and the rightwardly-positioned rip fence. Thus, because the center of gravity of the four-by-eight sheet is always inboard (toward the blade or table) of the leftwardly-extended support member, the operator can more easily maneuver and control such four-by-eight sheet workpieces during longitudinal ripping operations. This arrangement can also be employed in a right-side extension support assembly for rip-cuts made with the fence on the left side of the blade.

Preferably, in at least some forms of the invention, such support members are removably interconnectable with the rod or rods in either of a first or a second reversed or inverted orientation. The upper surfaces of these support members are coplanar with the upper surface of the work table when said support members are in the first orientation in order to support the workpiece flatly extending across the upper surface of the work table and across said upper surface of said support member. However, the upper surfaces of the support members lie in a lower plane, beneath the plane of the upper surface of the work table, when the support members are in the second inverted orientation. In this embodiment, the work table has a second upper table ledge surface adjacent its peripheral edge and coplanar with the lower plane. This allows an auxiliary work support panel adapted to be removably placed upon and supported by the second upper table ledge surface and the upper surface of the support members when in the second inverted orientation.

In addition, the present invention also provides for greater ease of slidably moving the support members inwardly and outwardly, toward and away from the table. This advantage is accomplished by providing one or more brackets under the work table with openings in such brackets for slidably receiving the rod or rods (or other such slidable extension members) and with such openings in at least the outboard of such brackets being enlarged horizontally to afford greater clearance when the rods are deployed inwardly or outwardly. For example, in one preferred embodiment having one or more cylindrical rods, the brackets support openings are somewhat elliptical in shape, with the major axis being oriented horizontally such that greater rod clearance is provided laterally or horizontally than vertically. This substantially eliminates, or at least minimizes, any tendency of the rod to bind during slidable movement, especially if the extension support assembly is not moved inwardly or outwardly in a direction perfectly perpendicular to the side of the work table. Furthermore, such horizontally-elliptical bracket support openings tend to self-center the rods, thus further contributing to their smooth, sliding movement.

Preferably, according to the present invention, the work table also includes a dust deflection skirt extending generally downwardly from a lower surface of the work table at least partially vertically into the generally hollow dust-receiving cavity portion of a dust shroud located within the saw's enclosed base and generally surrounding the lower portion of the blade. This skirt serves to deflect dust or chips produced by the cutting of the workpiece generally inwardly into the interior of the hollow dust-receiving cavity, especially when employed in conjunction with blade/splitter assemblies that can be raised or lowered, and/or angled, such that the blade or cutter directs such dust or chips toward different areas of the dust receiving cavity at different heights and/or angles.

Also, the preferred forms of the invention offer an improvement to the conventional table saws having a kerf splitter plate generally aligned with the cutting plane of the cutter and a pair of anti-kickback pawl pivotally attached at a generally upper end thereof to opposite sides of the kerf splitter plate and spaced laterally therefrom to slidingly engage its lower edge with the workpiece as it is moved past the cutter. The invention provides a generally button-shaped anti-kickback spacer attached to the anti-kickback pawl at an intermediate location thereon between the pivotal attachment to the kerf splitter plate and the lower edge of the anti-kickback pawl. Such spacers slidably engage the kerf splitter plate during pivoting of the anti-kickback pawl and are of thicknesses adapted to maintain the anti-kickback pawl in a generally parallel relationship with the kerf splitter plate. According to the invention, such spacers can be composed of, or coated with, a low-friction synthetic material and can either have a split root attachment portion with barbed ends to allow them to be easily and conveniently snapped into place in mounting holes on the pawls or be of a sealed-end blind rivet construction for ease of mounting on the pawls.

Additionally, the present invention provides hardened portions of the throat plate under the anti-kickback pawls to prevent them from gouging or digging into the softer material of the remainder of the throat plate when the blade and splitter are raised, lowered or angled with respect to the table top plane and to prevent the blade/splitter height and angular adjustment mechanism from binding when such height and angle adjustments are performed.

Additional objects, advantages, and features of the present invention will become apparent from the following description and the appended claims, taken in conjunction with the accompanying drawings.

BRIEF DESCRIPTION OF THE DRAWINGS

FIG. 12 is a partial cross-sectional view, illustrating yet another alternate mounting arrangement for the rear support members of FIGS. 6 through 11.

FIG. 13 is a partial cross-sectional view taken generally along line 13—13 of FIG. 6, illustrating the side extension support member of FIG. 6.

FIG. 14 is a perspective view, similar to that of FIG. 6, but illustrating still another alternate embodiment of the rear and side support members, configured to accommodate the use of standard dimensional lumber for intermediate support of large workpieces.

FIG. 15 is a partial cross-sectional view of the rear or side support members of FIG. 14, illustrating the use of standard dimensional lumber to provide additional vertical support for large or heavy workpieces.

FIG. 16 is a partial perspective view of an alternate embodiment of the rear or side support members of FIG. 14, also adapted to accommodate the use of standard dimensional lumber to provide additional vertical workpiece support.

FIG. 17 is a partial cross-sectional view of the support member of FIG. 16, but illustrating the additional vertical support member installed in place.

FIG. 18 is a partial cross-sectional view of the extension support members of FIGS. 15 through 16, adapted to accommodate the use of standard dimensional lumber for bracing the extension member angularly against the enclosed base of the table saw.

FIG. 22 is a partial elevational view, illustrating conventional anti-kickback pawls, with one of the pawls being shown in an inwardly deflected position caught between the kerf splitter plate and a workpiece.

FIG. 23 is a partial elevational view of the kerf splitter plate and one of the anti-kickback pawls of FIG. 1, according to the present invention.

FIG. 24 is a partial top view of the kerf splitter plate and anti-kickback pawls of FIG. 23.

FIG. 25 is a partial elevational view, similar to that of FIG. 22, but illustrating the anti-kickback pawls and pawl spacers of FIG. 1, according to the present invention.

DETAILED DESCRIPTION OF THE PREFERRED EMBODIMENTS

FIGS. 1 through 30 depict a number of embodiments of various features of the present invention, shown for purposes of illustration as incorporated into a table saw. One skilled in the art will readily recognize, however, that such features of the present invention are equally applicable for incorporation into other workpiece cutting machines, such as planers, jointers, shapers, routing tables, sanders and the like.

Figure 1:
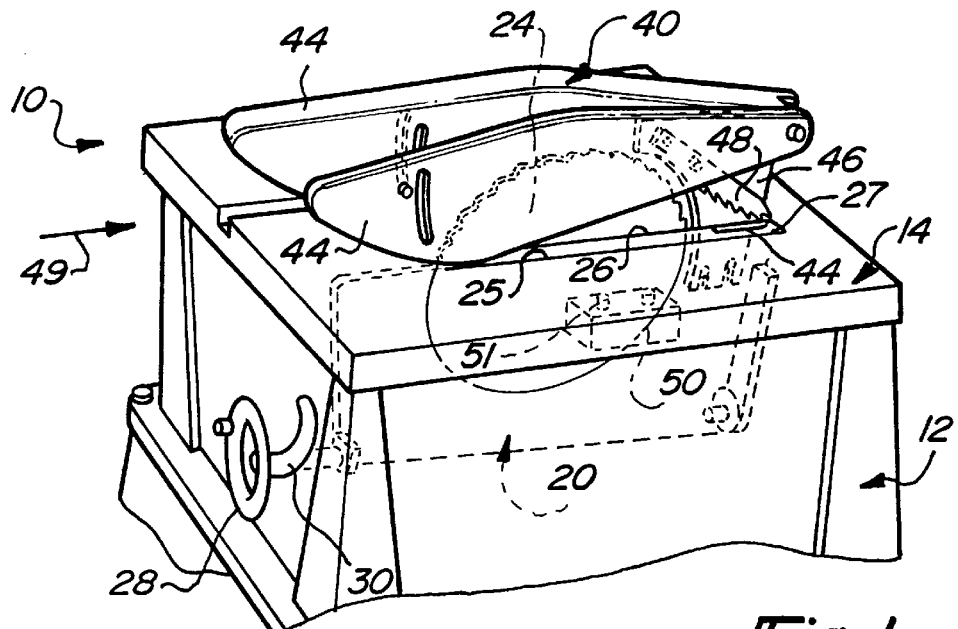
FIG. 1 is a perspective view of an exemplary table saw incorporating various features according to the present invention.
Figure 2:
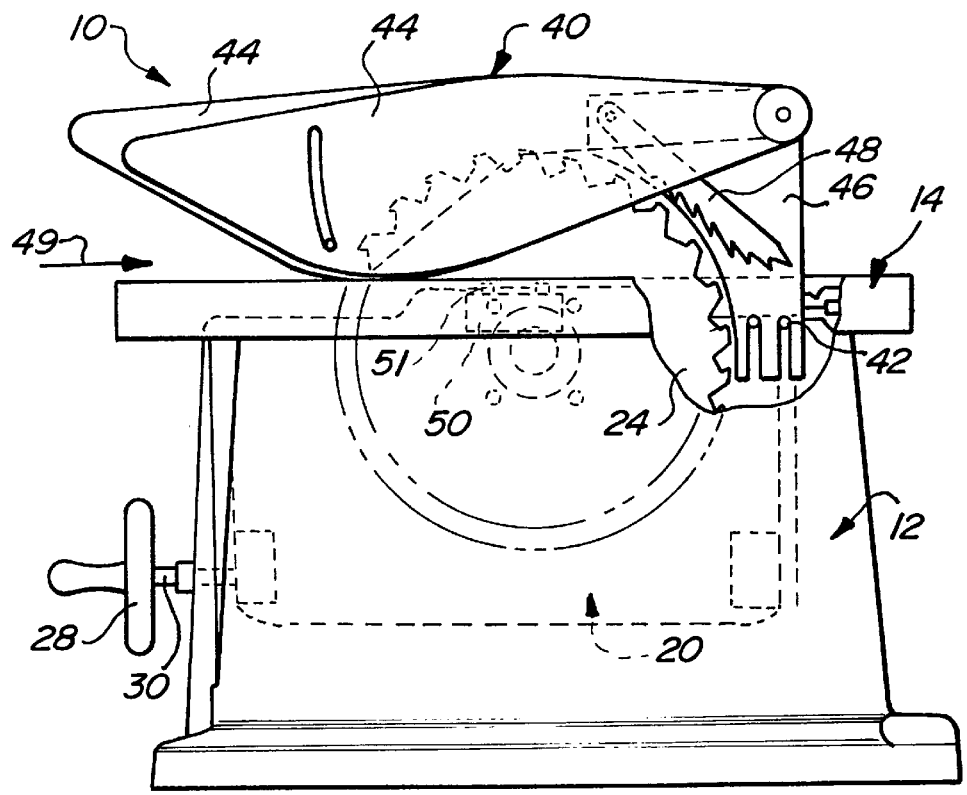
FIG. 2 is a side elevational view of the table saw of FIG. 1, partially cut away.

In FIGS. 1 and 2, an exemplary table saw 10 is shown for purposes of illustration and includes an enclosed base 12 that fixedly supports a generally rectangular work table 14. The enclosed base 12 houses a blade height/tilt mechanism 20 and a power drive assembly (not shown) for rotatably supporting a blade 24 in any of a number of desired blade raised or lowered and/or tilted positions. Such a table saw 10 would also, of course, be equipped with a rip fence and/or miter gage for performing rip-cuts or cross-cuts, but such components have been deleted from FIGS. 1 and 2 for purposes of clarity.

The table 14 includes a throat opening 25, in which a throat plate 27 is removably supported. The throat plate 27 has a blade slot or opening 26 extending longitudinally therethrough to allow the blade 24 to protrude vertically above the table 14 in order to engage a workpiece when performing cutting operations. As mentioned above, the height/tilt mechanism 20 can be adjusted, by way of a crank wheel 28 and a shaft 30, in order to raise or lower the blade 24 and/or adjust its angular orientation relative to the upper surface of the table 14.

The table saw 10 also includes a guard/splitter assembly 40 attached to the height/tilt mechanism 20 by way of a pair of fasteners 42 (shown in FIG. 2) such that the guard/splitter assembly 40 is. adjustably raised or lowered and/or tilted along with the blade 24. A kerf splitter plate 46 of the assembly 48 is aligned with the plane of the blade 24 regardless of the blade's adjusted vertical position and/or angular orientation. A pair of guard side shields 44 are pivotally attached to the kerf splitter plate 46 in order to shield the operator's hands from the blade 24 during workpiece cutting operations. Also pivotally attached on opposite sides of the kerf splitter plate 46 are anti-kickback pawls 48. As is conventional, the anti-kickback pawls 48 are spring-biased generally downwardly toward the table 14 and have serrated or toothed portions 47 on their lower edges for allowing a workpiece to slidably pass between the anti-kickback pawls 48 and the upper surface of the table 14 (and throat plate 27 and hardened portion 94) in a forward-to-rearward direction 49 during workpiece cutting operations, but grippingly engaging the workpiece and substantially preventing it from being thrown or kicked back toward the front or operator side of the table saw 10 during such cutting operations.

The table 14 also includes a pair of carrying handles 50 (explained in more detail below) on the underside of the table 14 and attached thereto by conventional fasteners 51. Other features of the present invention have been omitted from FIGS. 1 and 2 for purposes of clarity, but are illustrated in subsequent figures of the drawings and are also explained in detail below.

Figure 3:
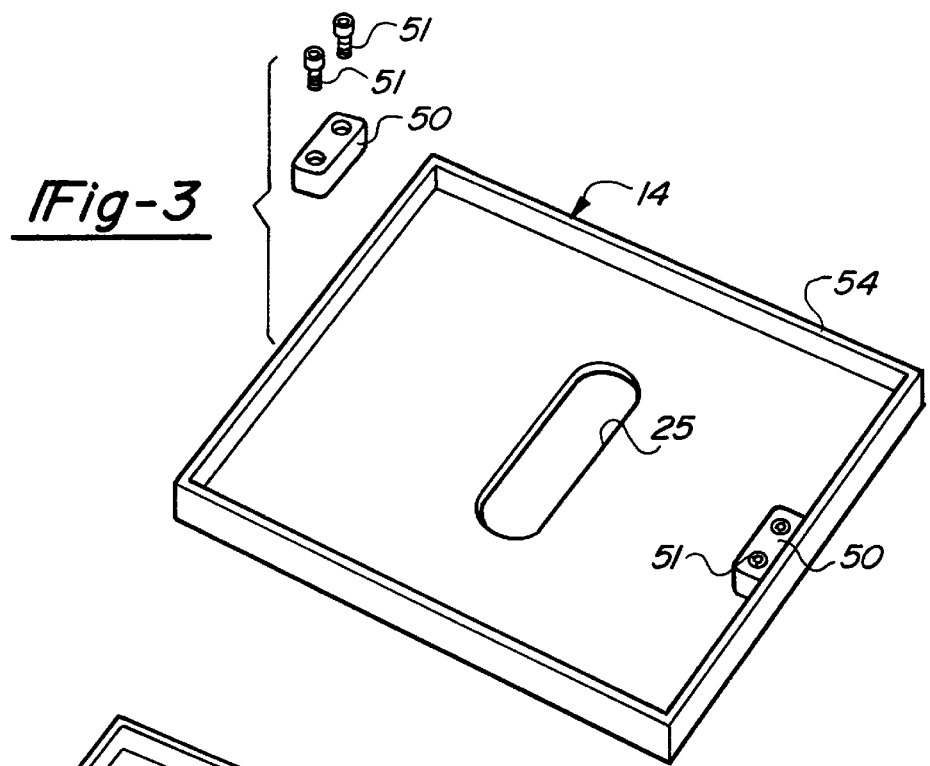
FIG. 3 is a blown-apart underside perspective view of one embodiment of the saw's table structure, illustrating the attachment of carrying handles.

FIG. 3 illustrates the underside of the table 14, and shows (partially exploded) the carrying handles 50 and the fasteners 51 for fixedly securing the carrying handles 50 to the underside of the table 14. The carrying handles 50 can be of a generally rectangular block-like configuration and can be composed of a suitable metal or plastic material. The carrying handles 50 are included on the underside of the table 14 to provide the operator with increased gripping surfaces in order to allow him or her to conveniently and comfortably lift the generally portable table saw 10 and transport it to desired work locations. The structure and shape of the carrying handles 50 substantially avoid the discomfort that would result to the operator if he or she were to lift the table saw 10 by gripping the narrow flanged edge 54 surrounding the periphery of the table 14 and protruding downwardly therefrom.

Figure 4:
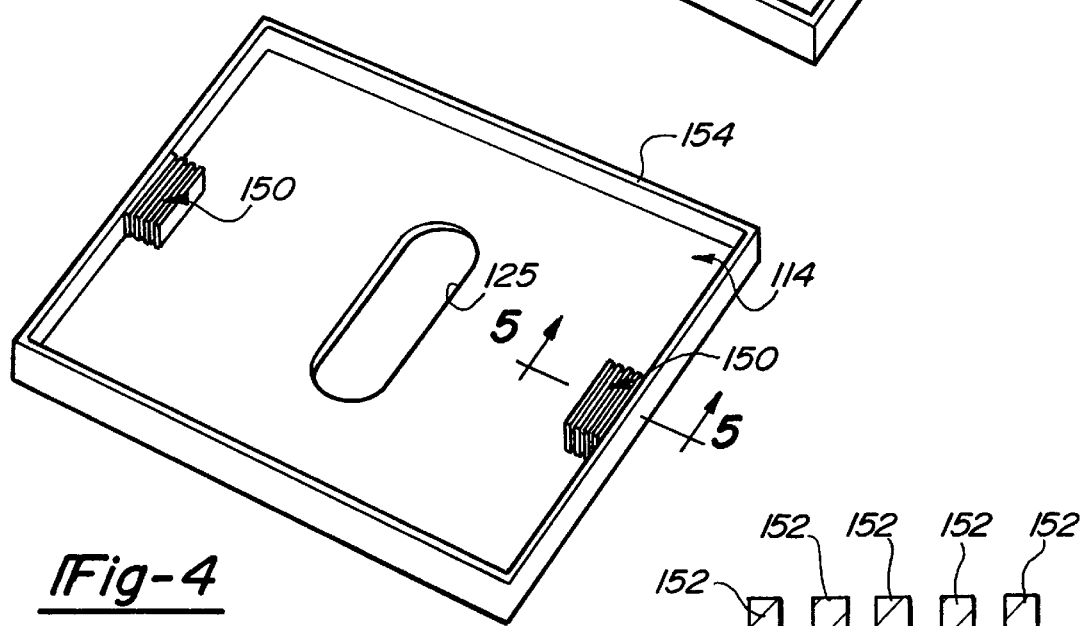
FIG. 4 is an underside perspective view similar to FIG. 3, but illustrating an alternate table structure embodiment having carrying handles integrally formed on the underside of the table.
Figure 5:
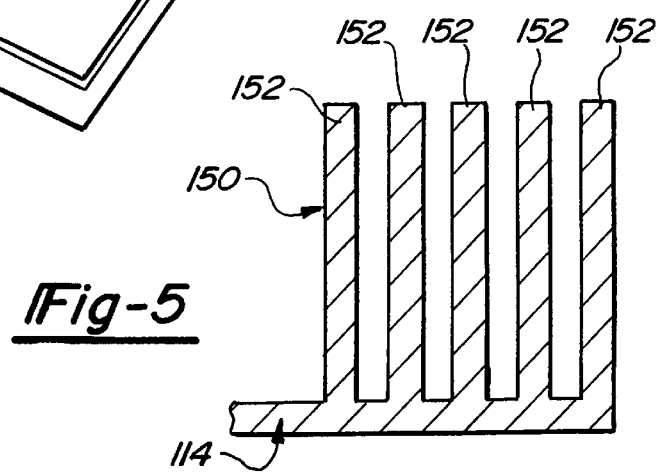
FIG. 5 is a partial cross-sectional view, taken along line 5—5 of FIG. 4.

In FIGS. 4 and 5, an alternate saw table 114 is illustrated and includes alternate carrying handles 150 on opposite sides of its underside. The alternate carrying handles 150 are formed by a series of spaced downwardly-protruding ribs 152 integrally cast with the table 114 and preferably parallel to one another and to the flanged edge 54. Thus, because of the close spacing of the series of ribs 152, they form a generally rectangular, generally block-like structure that provides the operator with an increased, convenient and comfortable gripping surface in order to allow him or her to lift the table saw and transport it from one work location to another, in a manner similar to the gripping surface provided by the carrying handles 50 illustrated in FIG. 3.

Figure 6:
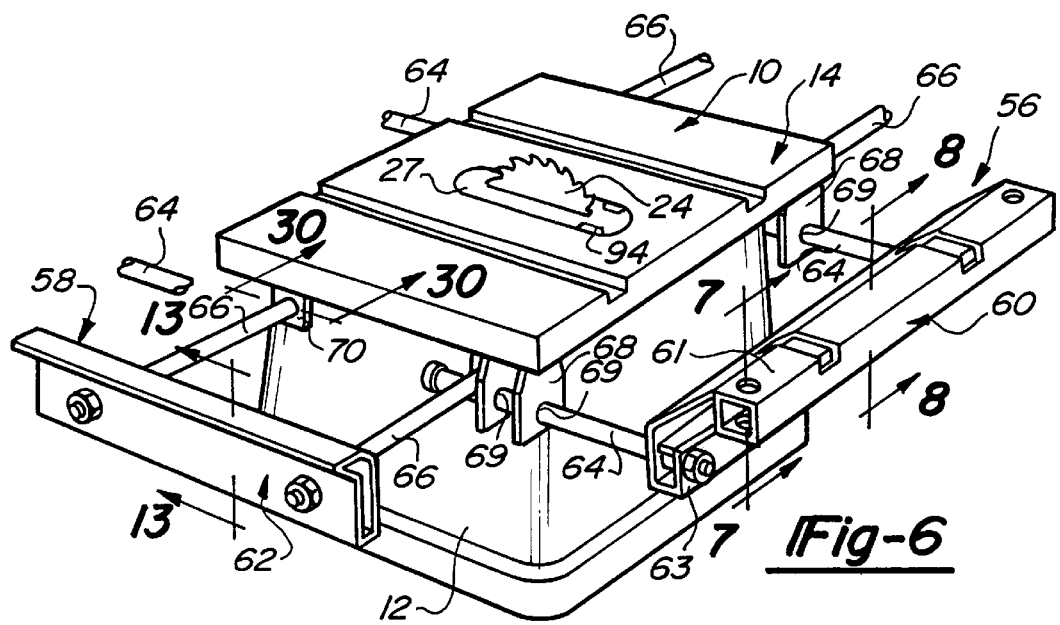
FIG. 6 is a perspective view of the table saw of FIG. 1, but incorporating side and rear extension structures for supporting large workpieces upon which cutting operations are to be performed.

FIG. 6 illustrates the table saw 10 of FIGS. 1 and 2 equipped with a rear (outfeed) extension support assembly 56 and a side extension support assembly 58 to allow the operator to conveniently and safely perform cutting operations on large, cumbersome, or heavy workpieces. It should be noted, as will become apparent to one skilled in the art, the side extension support assembly 58 can be included on either or both of the left and right sides of the table saw 10, and the rear extension support assembly 56 can also be included, if desired or necessary, on the front (infeed) of the table saw 10 as well. It should also be noted that the respective details and configurations of the rear extension support assembly 56 and the side extension support assembly 58 can be employed on either the front and/or rear sides, as well as on left and/or right sides of the table 14 if deemed desirable or necessary for particular table saw cutting operations.

Figure 7:
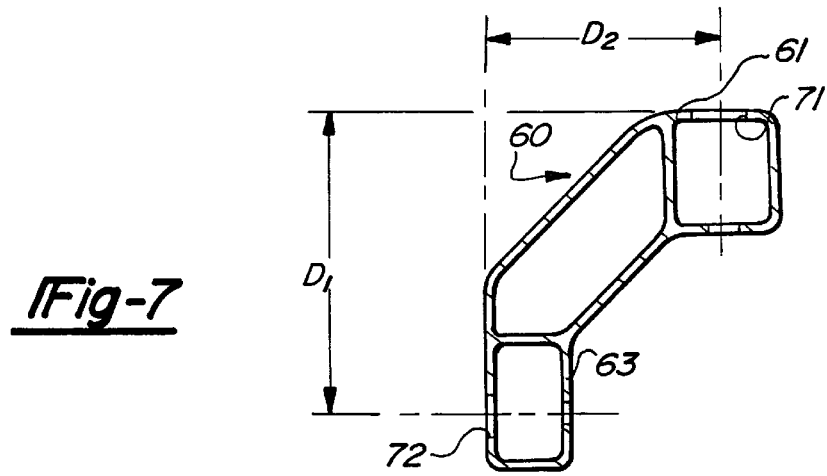
FIG. 7 is a partial cross-sectional view of the rear support member of FIG. 6, taken generally along line 7—7.
Figure 8:
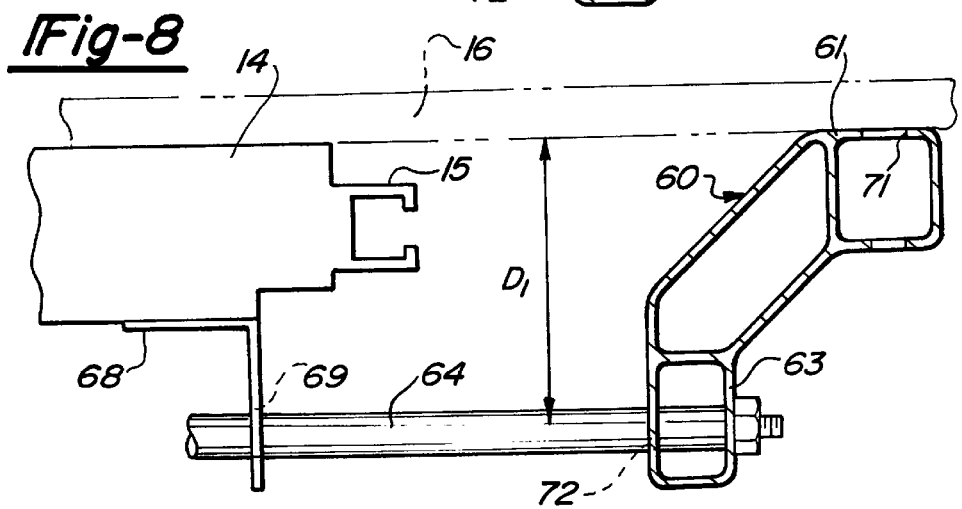
FIG. 8 is a partial cross-sectional view, illustrating the rear support member of FIGS. 6 and 7, taken generally along line 8—8 of FIG. 6.

As is illustrated in FIGS. 6 through 9, the rear extension support assembly 56 generally includes a rear support member 60 removably attached to two or more rods or rails 64 slidably received and carried in rod openings 69 in a corresponding number of brackets 68 that are fixedly secured to the underside of the table 14. As shown in FIG. 8, the rear support member 60 can be extended rearwardly toward or away from the table 14 to provide additional support for a workpiece 16 resting upon the table 14 for purposes of performing a cutting operation thereon. In the configuration illustrated in FIG. 8, the upper surface of a leg 61 of the rear support member 60 lies in the same plane of the upper surface of the table 14, thus supporting the workpiece 16 in a flat orientation with respect to the upper surface of the table 14, and with the workpiece 16 spanning the gap between the rearwardly-extended rear support member 60 and the table 14. This is due to the fact that the dimension $D_1$ (shown in FIG. 7) between the centerline of a mounting hole 72 in the opposite leg 63 of the support member 60 and the upper surface of the leg 61 is the same as the distance $D_1$ shown in FIG. 8 between the centerline of the rods or rails 64 and the upper surface of the table 14. The rear support member 60 can be secured to the rods or rails 64, which extend through the mounting holes 72 in the leg 63, by way of conventional threaded fasteners engaging threaded ends of the rods 64.

Figure 9:
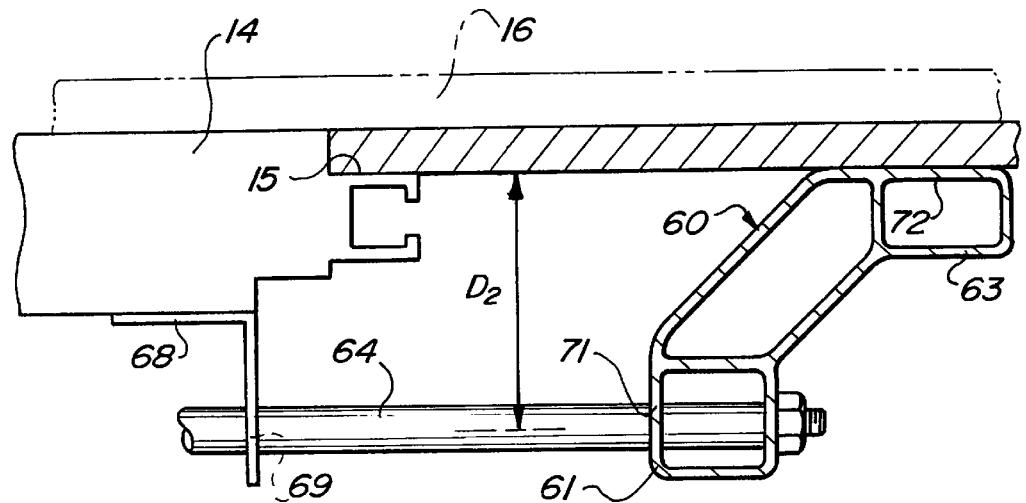
FIG. 9 is a partial cross-sectional view, generally similar to that of FIG. 8, but illustrating the support member in an inverted mounting for accommodating an auxiliary extension table panel.

Referring to FIGS. 7 and 9, it will be readily seen that the dimension $D_2$ between the centerline of the mounting hole 71 in the leg 61 and the inner surface of the leg 63 is less than the dimension $D_1$ between the centerline of the rods 64 and the upper surface of the table 14. The dimension $D_2$ is preferably less than the dimension $D_1$ by an amount corresponding to the thickness of commonly available sheet stock, such as three-quarter inch or one-half inch plywood or pressed chipboard, for example. Thus, as is shown in FIG. 9, the rear support member 60 can be removed from the rods 64 and reattached in an inverted position relative to that of FIG. 8, such that the rods 64 extend through the mounting holes 71 in the leg 61, rather than through the mounting holes 72 in the leg 63. This allows clearance for the insertion of an auxiliary support panel 59 (shown in FIG. 9) that has its upper surface coplanar with the upper surface of the table 14, with the support panel 59 resting upon the ledge 15 at the edge of the table 14 and the leg 63 of the support member 60 in order to provide intermediate support for the workpiece 16 between the table 14 and the rear support member 60.

Figure 10:
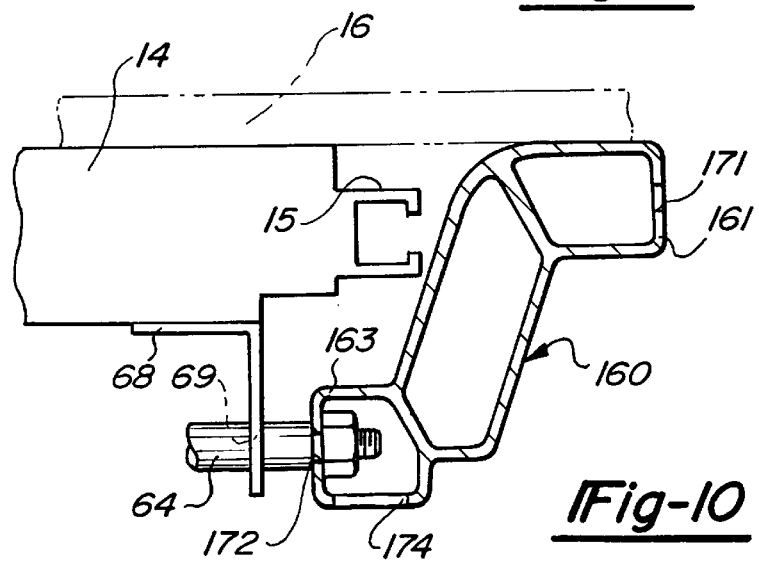
FIG. 10 is a partial cross-sectional view, similar to that of FIG. 8, but illustrating an alternate embodiment of the rear support member.
Figure 11:
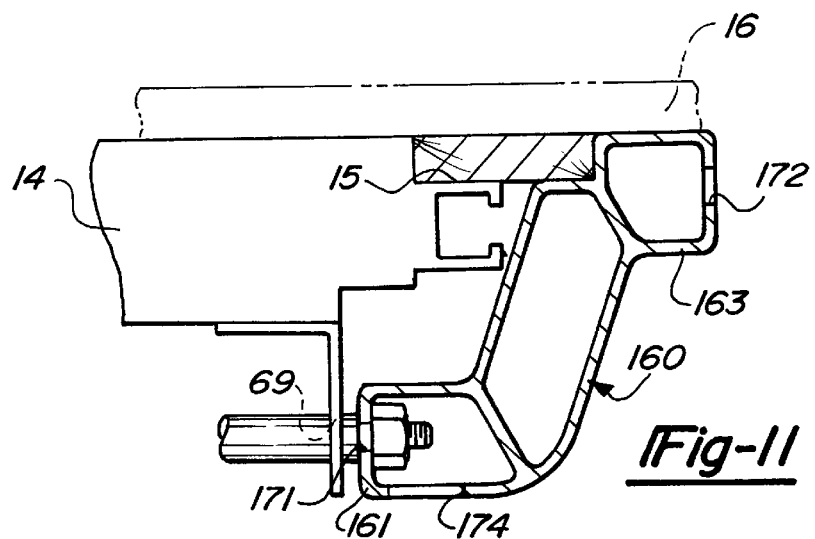
FIG. 11 is a partial cross-sectional view, similar to that of FIG. 9, but illustrating the alternate rear support member of FIG. 10 in an inverted mounting configuration for accommodating an auxiliary extension table panel.

FIGS. 10 and 11 illustrate-an alternate embodiment rear extension support assembly 156, generally similar to the rear extension support assembly 56 shown in FIGS. 6 through 9, having an alternate rear support member 160 slidably extendable toward and away from the table 14 on the rails or rods 64. The principles for use and operation of the alternate rear extension support assembly 156 are similar to those of the rear extension support assembly 56 shown in FIGS. 6 through 9, except that the leg 163 of the alternate rear support member 160 has a ledge or recessed cut-out portion 165 thereon.

As shown in FIG. 11, in which the rear support member 160 is illustrated in an inverted configuration relative to that of FIG. 10, the depth of the ledge or recessed cut-out 165 is such as to allow it to accommodate the thickness of commonly available sheet stock used as an auxiliary support panel 59, similar to that shown in FIG. 9. It should be noted that the attachment of the rear support member 160 to the rods or rails 64 by way of conventional threaded fasteners engaging a threaded end of the rods 64 can be accomplished by way of access openings 173 and 174 in the respective legs 161 and 163 of the rear support member 160. Alternatively, since the rear support member 160 is preferably formed from an open-ended extrusion, access to the ends of the rods 64 for purposes of fastening them to the rear support member 160 can also be had through the open ends of the rear support member 160.

Such attachment to the rods or rails 64 can also optionally be accomplished by way of an attachment arrangement shown in FIG. 12, in which still another alternate cross-sectional shape of the cross-section of a rear extension support member 260. In this alternate embodiment, the attachment of the rods 64 is accomplished by inserting them through a large opening 271 until they abut the inside of the cross-section of the leg 263. A bolt 275 or other such conventional threaded fastener is then inserted through the small opening 276 to threadably engage a threaded cavity 277 in the outer end of an alternate rod 264. It should be noted that this attachment arrangement can alternately be employed with any of the rods 64 or 66 shown in FIGS. 6 through 11.

Referring to FIGS. 6 and 13, an exemplary side extension support assembly 58 includes a side support member 62 attached to rods or rails 66 that are slidably received and carried by brackets 70 fixedly attached to the underside of the table 14. The upper surface of the side support member 62 is such that it is coplanar with the upper surface of the table 14, thus providing additional side support for large workpieces upon which cutting operations are to be performed on the table saw 10. As mentioned above, it should be noted that the side extension support assembly 58 can be included on either or both of the left or right sides of the table saw 10. Additionally, as is also mentioned above, the rear extension support assemblies 56, 156, or 256, illustrated in FIGS. 6 through 12 can optionally be substituted for the side extension support assembly 58 if deemed desirable or necessary for particular cutting operations.

FIG. 14 illustrates the table saw 10 of FIGS. 1 and 2, but incorporating an alternate support arrangement for cutting large or cumbersome workpieces. In FIG. 14 the table saw 10 is equipped with an alternate rear extension support assembly 56 and an alternate side extension support assembly 358, respectively having a rear support member 360 and a side support member 362 extendable toward and away from the table 14 on the respective rods or rails 64 and 66, in a similar manner to that of the rear extension support assembly 56 and to that of the side extension support assembly 58 shown in FIG. 6. It should be emphasized that in FIG. 14, as well as in FIG. 6, discussed above, that the guard/splitter assembly have been deleted only for purposes of clarity of illustration.

The length of the vertical leg 363 of the rear support member 360 is such that the upper surface of the leg 361 is coplanar with the upper surface of the table 14 in order to allow a large or cumbersome workpiece to be supported in a flat orientation relative to the table 14. The length of the vertical leg 363 is also such that the dimension between the centerline of the rods 64 and the upper surface of the leg 361 corresponds with the depth of standard dimensional lumber, such as standard dimensional 2×4's when such dimensional lumber is laid across the upper surfaces of the rods 64 on its edge. Similarly, as is shown in FIG. 14, the cross-section of the side support member 362 is dimensioned such that its upper edge is coplanar with the upper surface of the table 14, and such that when a similar dimensional lumber (such as a 2×4) is laid on its flat side across the upper surfaces of the rod 66, such dimensional lumber piece will have its upper surface coplanar with the upper surface of the side support member 362 and the upper surface of the table 14. Therefore, intermediate support between the table 14 and either or both of the rear support member 360 and the side support member 362 is easily and conveniently provided when performing cutting operations upon large, cumbersome workpieces.

Optionally, the vertical legs of the rear support member 360 and the side support member 362 can be equipped with mounting holes 371 at different vertical locations thereon, such that the rear support member 360 and the side support member 362 can be identical and interchangeable.

Referring to FIGS. 14 and 15, still additional vertical support for large and cumbersome workpieces can be provided by the inclusion of brace or support members 322, which are engaged by a downwardly-protruding cleat or lip 381 on the rear support member 360 (as well as a similar cleat or lip on the side support member 362). The cleat 381 grips the upper end of the vertical brace or support 322, which in turn extends downwardly to the floor, bench or other surface upon which the table saw 10 is placed.

Similarly, an alternate rear support member 460 is shown in FIGS. 16 and 17, and includes brace openings 482. In this embodiment, the brace or support member 322 can be engaged by the cleat or lip 481 and have its upper corner extend through the brace opening 482 at either end of the rear support member 460. Common threaded fasteners can be inserted through fastener holes 483 in order to further anchor the brace or support member 322 to the rear support member 460. It should be noted that either of the arrangements for attaching the brace or support member 322 to the rear support members 360 or 460 shown in FIGS. 15 through 17 can be employed in connection with the side support member 362.

Furthermore, as is illustrated in FIG. 18, either of the rear support members 360 or 460 can be removed from the rods 64 and re-mounted in the reversed orientation shown in FIG. 18. In this reversed orientation, the brace or support members 322 can be positioned in an angular relationship relative to the support members and the table saw's enclosed base 12 to provide an angular brace for providing additional support for large or heavy workpieces. In this arrangement, the brace or support member 322 passes through an opening or cutout portion 380 (or 480) to engage the respective cleats or lips 381 or 481. Again, as will be readily apparent to one skilled in the art, a similar angular brace arrangement to that shown in FIG. 18 can also optionally be employed in connection with the side support member 362.

Figure 19:
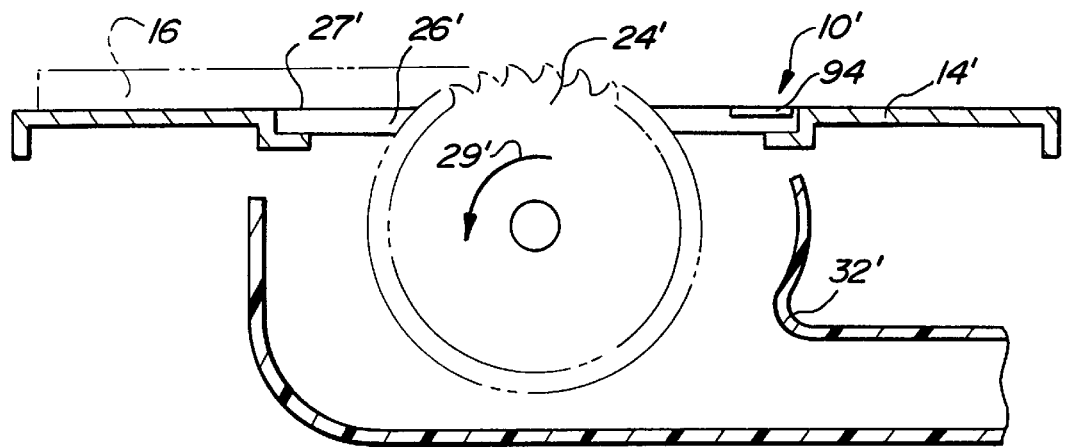
FIG. 19 is a partial cross-sectional view, illustrating a conventional saw table equipped with a dust shroud for extracting dust and chips from within the enclosed base of the table saw.

Referring to FIG. 19, a conventional table saw 10', according to the prior art, has a table 14', under which a dust shroud 32' is positioned for collecting and conveying away dust and/or chips that pass through the slot or opening 26' in the throat plate 27', in order to prevent or at least reduce the accumulation of dust and chips within the saw's enclosed base. Typically, however, dust or chips are propelled downwardly by the rotation of the blade 24' in the direction 29' with sufficient force that small dust particles can pass through the gap (shown exaggerated) between the upper edge of the dust shroud 32' and the bottom of the table 14'.

Figure 20:
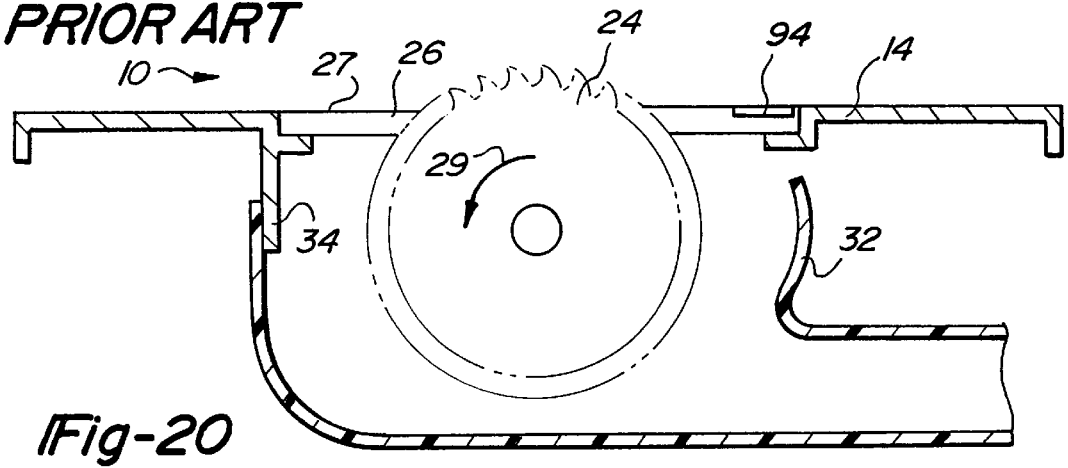
FIG. 20 is a partial cross-sectional view similar to that of FIG. 19, but illustrating the provision of a dust deflection skirt on the underside of the table to deflect dust or chips into the dust shroud according to the present invention.
Figure 21:
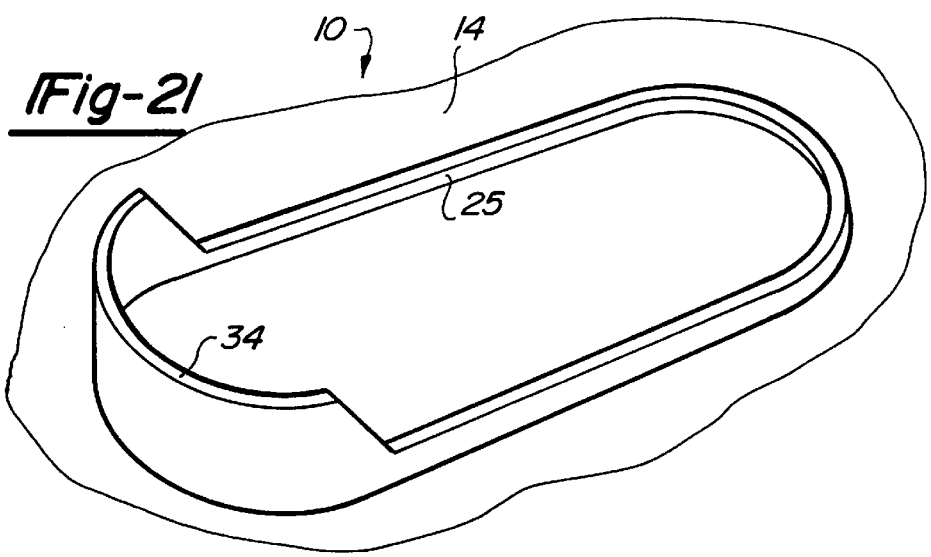
FIG. 21 is a partial view of the underside of the saw table, illustrating the dust deflection skirt of FIG. 20.

Thus, in accordance with the present invention, as illustrated in FIG. 20, the table 14 of the table 10 is equipped with a dust deflection skirt 34 protruding downwardly therefrom as illustrated in FIGS. 20 and 21. Because of the rotation of the blade 24 in the rotational direction 29, the dust deflection skirt need only extend laterally from the lower surface of the table 14 around the front or operator end of the throat opening 25 of the table 14. This dust deflection skirt preferably extends downwardly from the underside of the table 14 to a position sufficient that it overlaps the inner front edge of the dust shroud 32, thus deflecting any dust or chips in a rearward direction, toward the generally hollow interior of the dust shroud 32, regardless of the adjusted height and/or angular position of the blade 24 and guard splitter assembly 40.

Referring to FIG. 22, in conventional table saws 10' of the prior art, anti-kickback pawls 48' are typically pivotally attached at their upper ends near the upper edge of the kerf splitter plate 46' and are spaced laterally therefrom in order to slidably engage a workpiece being moved from the front or operator side of the saw toward the rear side of the saw during cutting operations. However, because such conventional anti-kickback pawls 48' are laterally unsupported along most of the length to their lower edges, they can undesirably be inadvertently deflected inward, as is illustrated in FIG. 22, and become caught or trapped between the kerf splitter plate 46' and a workpiece or between the kerf splitter plate 46' and the opening 26' in the throat plate 27'.

According to the present invention, as illustrated in FIGS. 23 through 25, the anti-kickback pawls 48 of the table saw 10 are equipped with anti-kickback spacers 90, which are preferably of a low-friction generally "button-shaped" configuration and are located at an intermediate location between the ends of the anti-kickback pawls 48. Such anti-kickback spacers 90 protrude laterally inwardly and slidably engage the kerf splitter plate 46 in order to maintain the anti-kickback pawls 48 in their proper orientation, parallel to the kerf splitter plate 46, as is illustrated in the elevational view of FIG. 25. The replaceable anti-kickback spacers 90 can be composed of a low-friction synthetic material, and can have split root attachment pegs or portions 92 with barbs 93 on their ends such that the spacers 90 can be snapped into place on the anti-kickback pawls 48 by forcibly inserting them into the mounting holes or openings 91 on the anti-kickback pawls 48. As such, the anti-kickback spacers 90 serve to prevent laterally inward deflection of the anti-kickback pawls 48, thus maintaining them in their effective vertical orientations parallel to the kerf splitter plate 46.

Figure 25A:
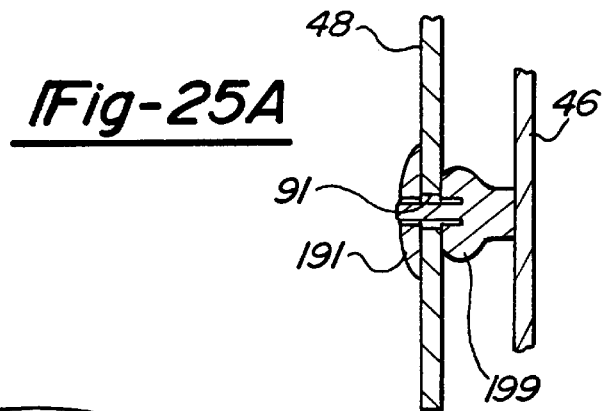
FIG. 25A is a partial cross-sectional detail view of yet another construction for the anti-kickback pawl spacers of FIG. 25.

FIG. 25A illustrates yet another advantageous construction in which the anti-kickback pawl spacers 190 are sealed-end blind rivets, such as those well-known blind rivets marketed under the trademark POP, for example. In this construction, the sealed deformed end 199 of the spacers 190 are on the inboard side of the anti-kickback pawls 48 to maintain the proper spacing from the kerf splitter plate 46. Such a construction is inexpensive and requires no special tooling for assembly, other than a common and inexpensive blind rivet installation apparatus. Furthermore, it simplifies and speeds up the assembly of the anti-kickback pawls. The spacers 190 can be of a low-friction synthetic or metallic composition, such as steel or aluminum, for example, and their sealed-ends 199 can be coated with low-friction synthetic material if deemed necessary in a given application.

Figure 26:
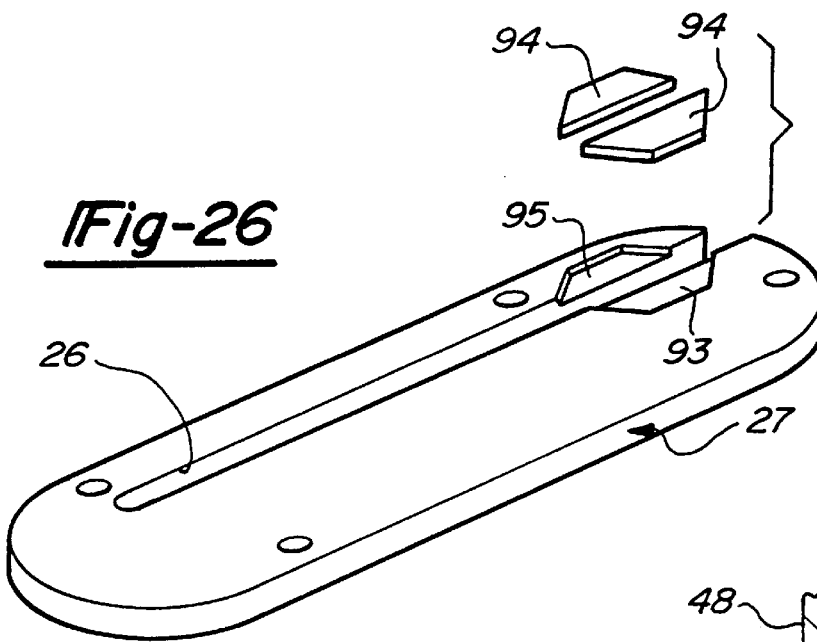
FIG. 26 is a perspective view of the throat plate of the table saw of FIG. 1, illustrating hardened inserts in the areas thereof that are contacted by the anti-kickback pawls.
Figure 27:
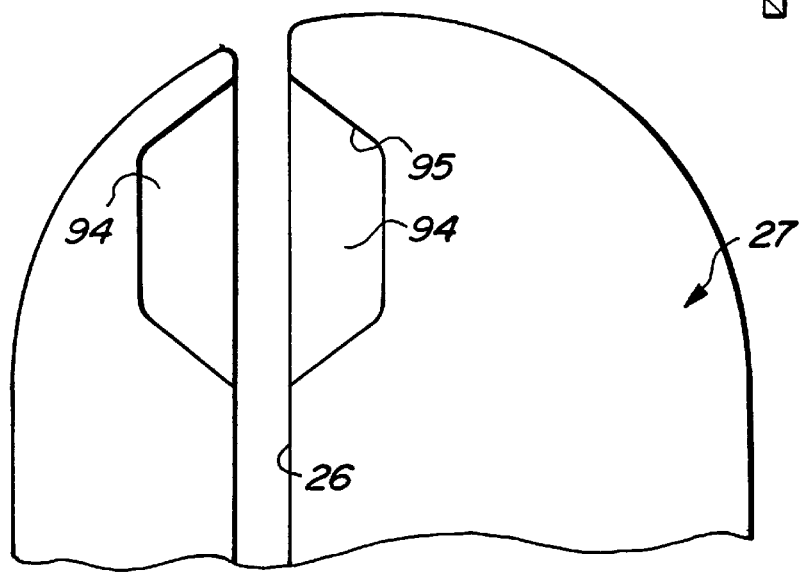
FIG. 27 is an enlarged plan view of a portion of the throat plate shown in FIG. 26.

FIGS. 26 and 27 illustrate some of the details of the throat plate 27, which is preferably equipped with hardened portions or inserts 94 located in recesses 96 formed in the rear of the softer throat plate 27 in the area contacted by the serrated lower edges 47 of the anti-kickback pawls 48 (as shown in FIG. 23, for example). Such inserts 94 can be separate hardened inserts bonded or press-fit into the recesses 96, or they can be hardened members integrally formed or molded, such as in the case of molded synthetic throat plates, for example. Such hardened inserts or portions 94 serve to substantially prevent or at least minimize gouging or abrading of the softer throat plate material by the serrated anti-kickback pawls 48, as well as binding of the blade height mechanism when lowering the blade. Preferably the inserts 94 are symmetrical, identical, and thus interchangeable right-to-left so that only a single part need be manufactured.

Finally, it should be noted that any or all of the various features of the present invention depicted in the drawings and described herein can be incorporated either singularly on a table saw or other cutting machine according to the present invention, or they can be used advantageously in any combination of any two or more of such features on such a saw or machine.

Figure 28:
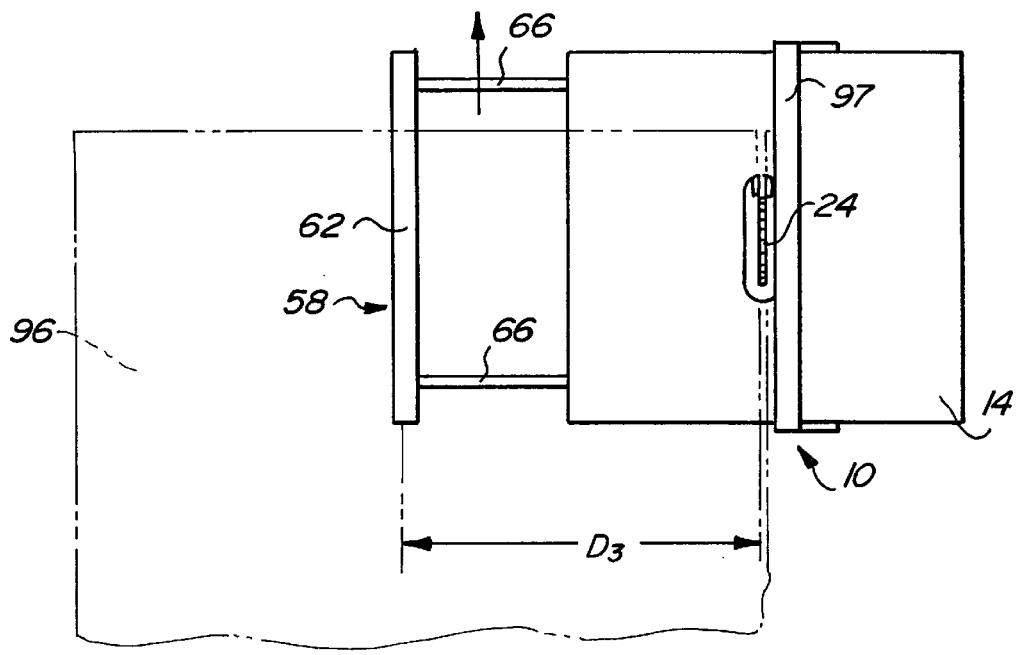
FIG. 28 is a plan view of an exemplary table saw according to the invention with a side extension support member being employed during the longitudinal ripping of a "four-by-eight" sheet workpiece.

FIG. 28 illustrates one such especially advantageous application of the invention that is particularly useful when rip-cutting large workpieces on the table saw 10, such as commonly-encountered sheet stock that is four feet wide and eight feet long. In FIG. 28, a four-by-eight sheet 96 (which can be plywood, particle or chip board, press board, wall paneling, or other such materials) is being fed longitudinally into the blade 24 with its long dimension parallel to the plane of rotation of the blade 24 in order to rip-cut the sheet near its right-hand edge, with a rip fence 97 positioned closely adjacent the right-hand edge of the blade 24.

According to the present invention, the side extension support member 62 of the extension support assembly 58 is extendable outwardly with the rods 66 to the left of the work table 14 a sufficient distance $D_3$ from the blade 24 so that the sheet 96 is properly supported during such longitudinal ripping, regardless of the position of the rip fence 96 relative to the right-hand-side of the blade 24. The distance $D_3$ is selected such that more of the sheet 96 is supported by the extension support member 62 and the work table 14 than is unsupported at positions leftwardly outboard of the support member 62. Thus the center of gravity of the sheet 96 is always inboard of the support member 58 no matter how small an amount of the sheet 96 is being rip-cut from the sheet on the opposite, right-hand side of the blade 24. This greatly facilitates the ease of manipulation of the four-by-eight sheet 96 during such ripping operations. This arrangement can also be employed in a right-side extension support assembly when the fence is positioned leftwardly of the blade 24. In this regard, it should be noted that the side support member 58 can be replaced by any of the support member configurations or arrangements discussed above and shown in FIGS. 6 through 18.

Figure 29:
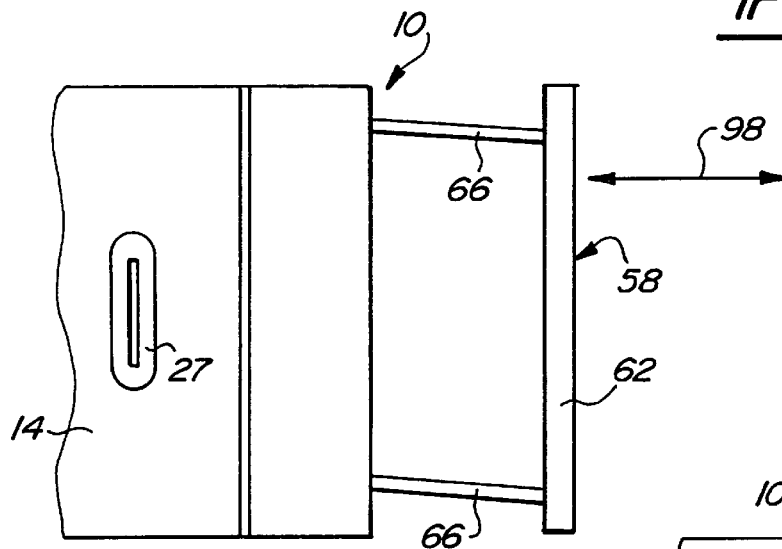
FIG. 29 is a partial plan view of a prior art work table and extension support member.

FIG. 29 illustrates (in the context of the table saw 10) a problem inherent in prior art extension support assemblies. In the plan view of FIG. 29, the support member 58 is being pulled outwardly or pushed inwardly in a direction 98 (shown exaggerated) that is not perfectly parallel to the rod openings of the brackets slidably receiving and supporting the rods 66. This condition tends to bind the rods 66 and prevent easy and smooth sliding movement relative to the rod support brackets (shown, e.g., in FIGS. 6 and 14).

Figure 30:
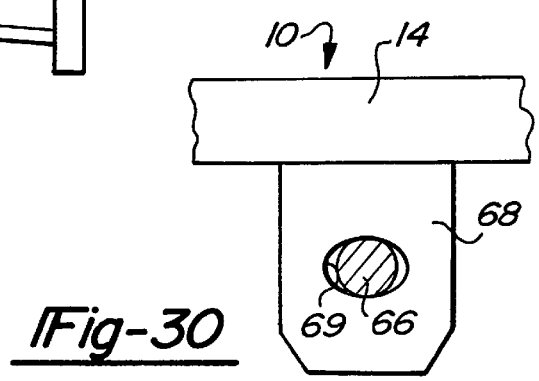
FIG. 30 is an exemplary cross-sectional view, taken generally along line 30—30 of FIG. 6.

FIG. 30 illustrates the present invention's solution to the problem shown in FIG. 29. In order to prevent or at least minimize such binding of the rods 66, the rod openings 69 in the outboard one of each pair of rod support brackets 68 is enlarged horizontally to provide greater horizontal clearance than is provided vertically. In the case of the exemplary cylindrical rods 66, such outboard rod openings 69 can be elliptical in shape, with the major axis of the ellipsis being horizontal, thus providing the increased horizontal clearance (at the outboard brackets) to reduce the tendency of the rods 66 to bind. In addition, as mentioned above, this horizontally elliptical shape tends to selfcenter the rods 66, thus further contributing to smooth sliding movement.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

What is claimed is:

1. A cutting machine having a base, a generally horizontal work table supported by the base, a cutter opening in the work table, a rotatable cutter protruding through the cutter opening for performing cutting operations on a workpiece placed upon an upper surface of the work table and moved longitudinally by an operator into engagement with the cutter, the work table having a downwardly-extending flanged edge extending around at least a portion of its periphery, the improvement comprising a carrying member on an underside of the work table generally adjacent the flanged edge and extending laterally inward therefrom, said carrying member having a lateral dimension substantially greater than the lateral thickness of the flanged edge in order to provide a gripping surface to be grasped by the operator in order to lift and transport the cutting machine from one work location to another.

2. A cutting machine according to claim 1, wherein said carrying member is integrally formed with the work table.

3. A cutting machine according to claim 2, wherein said carrying member is defined by a series of spaced-apart ribs extending downwardly from the underside of the work table and located generally adjacent the flanged edge thereof, said ribs having downwardly-facing edges that together define said gripping surface.

4. A cutting machine according to claim 3, wherein said ribs are generally parallel to one another.

5. A cutting machine comprising:

a base;

a generally horizontal work table supported by said base, said work table defining a cutter opening, an underside and a peripheral edge;

a cutter extending through said cutter opening;

a downwardly extending flange having a lateral thickness and extending around at least a portion of said peripheral edge;

a carrying member disposed on said underside of said work table adjacent to said flange, said carrying member having a lateral dimension greater than said lateral thickness of said flange in order to provide a gripping surface.

6. The cutting machine according to claim 5 wherein, said carrying member is integrally formed with said work table.

7. The cutting machine according to claim 6 wherein, said carrying member comprises a plurality of spaced-apart ribs extending from said underside of said work table, each of said plurality of ribs having an edge which define said gripping surface.

8. The cutting edge according to claim 7 wherein, said plurality of ribs are generally parallel to one another.

9. The cutting machine according to claim 7 wherein, said plurality of ribs are generally parallel to said flange.

10. cutting machine according to claim 5 wherein, said carrying member comprises a plurality of spaced-apart ribs extending from said underside of said work table, each of said plurality of ribs having an edge which define said gripping surface.

11. cutting edge according to claim 10 wherein, said plurality of ribs are generally parallel to one another.

12. The cutting machine according to claim 10 wherein, said plurality of ribs are generally parallel to said flange.

* * * * *